United States Patent
Maguin (10) Patent No.: US 8,246,285 B2
(45) Date of Patent: Aug. 21, 2012

(54) BARRIER SYSTEM FOR AN AIRCRAFT LOADER

(75) Inventor: Antoine Maguin, Rungis Cedex (FR)

(73) Assignee: TLD (Canada) Inc., Sherbrooke (CA)

( * ) Notice: Subject to any disclaimer, the term of this patent is extended or adjusted under 35 U.S.C. 154(b) by 561 days.

(21) Appl. No.: 12/517,070

(22) PCT Filed: Nov. 30, 2007

(86) PCT No.: PCT/CA2007/002162
§ 371 (c)(1),
(2), (4) Date: May 31, 2009

(87) PCT Pub. No.: WO2008/064486
PCT Pub. Date: Jun. 5, 2008

(65) Prior Publication Data
US 2010/0068018 A1    Mar. 18, 2010

Related U.S. Application Data

(60) Provisional application No. 60/861,723, filed on Nov. 30, 2006.

(51) Int. Cl.
*B65G 67/02* (2006.01)
(52) U.S. Cl. ......... 414/399; 414/347; 414/495; 182/113
(58) Field of Classification Search .................. 414/347, 414/399, 495, 498, 501; 182/113
See application file for complete search history.

(56) References Cited

U.S. PATENT DOCUMENTS

| | | | | |
|---|---|---|---|---|
| 1,615,812 A | * | 1/1927 | Romine | 414/347 |
| 3,489,300 A | * | 1/1970 | McCartney et al. | 414/351 |
| 3,524,563 A | | 8/1970 | McCartney et al. | |
| 3,727,721 A | * | 4/1973 | Kulesa | 182/62 |
| 4,304,518 A | * | 12/1981 | Carder et al. | 414/495 |
| 6,357,986 B1 | * | 3/2002 | Sonnamaker et al. | 414/343 |
| 2006/0104760 A1 | | 5/2006 | Cecil et al. | |

FOREIGN PATENT DOCUMENTS

| | | | |
|---|---|---|---|
| CA | 1144896 A | | 4/1983 |
| CA | 2590638 A | | 6/2006 |
| GB | 2423977 A | * | 9/2006 |
| JP | 2003292117 A2 | | 10/2003 |

* cited by examiner

*Primary Examiner* — Scott Lowe
(74) *Attorney, Agent, or Firm* — Baker & Hostetler LLP

(57) ABSTRACT

An aircraft loader including a bridge platform, an elevator platform and a barrier system is provided. The barrier system has first and second guiding elements respectively attached to the bridge platform on each side thereof, and first and second supporting elements respectively mounted on a corresponding side of the elevator platform. The barrier system is provided with an inverted-U-shaped element having first and second legs and a transverse element extending therebetween, each of the legs being slidably mounted inside a corresponding guiding element and cooperating with a corresponding supporting element adapted for supporting the legs and driving the inverted-U-shaped element with the elevator platform. The inverted-U-shaped element is slidable between a raised position providing a passage for loads thereunder when both platforms interface and a lower position wherein the transverse element extends across the passage for providing a guardrail between the platforms when the elevator platform extends below the bridge platform.

14 Claims, 5 Drawing Sheets

FIG. 6

BARRIER SYSTEM FOR AN AIRCRAFT LOADER

CROSS-REFERENCE TO RELATED APPLICATIONS

This application is a National Stage of PCT/CA2007/002162, filed on Nov. 30, 2007, which claims priority to U.S. Provisional Patent Application Ser. No. 60/861,723, filed on Nov. 30, 2006, which are incorporated herein by reference in their entirety.

FIELD OF THE INVENTION

The present invention generally relates to aircraft loaders for transferring cargo and freight to and from an aircraft cargo bay for example. The invention more particularly concerns a barrier system for an aircraft loader particularly adapted for improving safety of the operators working on the loader.

BACKGROUND OF THE INVENTION

Loaders are used for aircraft servicing and are designed to transfer containers, pallets, luggage and other types of goods to aircrafts. Many of the existing loaders have an elevator platform, a bridge platform for interfacing the elevator platform to the aircraft cargo bay, and a control station for controlling operation of the loader.

Different safety mechanisms have been proposed in the art to improve the safety of the operators working on the loader. For example, longitudinal guardrails extending along the bridge platform have been proposed for preventing falling of the operator. Known in the art, there is U.S. Pat. No. 3,524,563 granted to Mc Cartney et al. which describes hand rails mounted on each longitudinal side of the bridge platform and acting as a safety feature for the operators. Each hand rail may be pivoted to a horizontal out-of-the-way position when vertical clearance is needed.

Other retractable guardrails extending under the raised platforms for preventing an operator accessing below the platforms when they are raised have also been proposed. US patent application published under No. 2006/0104760 describes such a system.

In fact, when an operator loads goods inside or outside the aircraft, he generally stands on the bridge platform and is not still aware of the movement of the elevator platform behind him. This movement could be dangerous for the operator since he can fall from the bridge platform when the elevator platform extends at a lower level.

In an attempt to remedy to this issue, in international patent application published under No. WO2006/063453, the applicant of the present invention proposed a retractable handrail mechanism mounted along an end of the bridge platform, between the elevator platform and the bridge platform. The retractable handrail mechanism has an extended position wherein the handrails are raised across the goods path for blocking passage of the goods between the bridge platform and the elevator platform. The retractable handrails also has a retracted position wherein the handrails are moved away from the goods path when both platforms extend at the same level for allowing passage of the goods between both platforms. The retractable handrail mechanism is advantageously responsive to the movement of the elevator platform and is provided with a handrail retracting mechanism for operating the handrails between each of the extended and retracted positions. As described, the handrails may vertically fold on itself. It is also mentioned that a weight-and-pulley device or a pivoting device for vertically lowering the handrails below the bridge platform when both platforms extend at the same level could be used.

This system improves over the prior art in providing a controllable guardrail preventing falling of the operator from the bridge platform to the elevator platform when both platforms do not extend at the same level. The proposed system however remains quite complicate to implement.

It would therefore be desirable to provide an improved barrier system for a loader that will provide a guardrail between the bridge platform and the elevator platform for preventing falling of an operator when the two platforms do not extend at the same level. It would also be desirable that such a barrier system be easy to implement while its design fulfils safety regulations in the field of aircraft loaders. It would be even more desirable to provide a barrier system that would be responsive to the movement of the elevator platform, thereby providing a secure system that will not be time consuming for the operator.

SUMMARY OF THE INVENTION

An object of the present invention is to provide an aircraft loader that satisfies the above-mentioned needs.

Accordingly, the present invention provides an aircraft loader having a bridge platform, an elevator platform, and a barrier system. The barrier system has first and second upright guiding elements, each being respectively attached to the bridge platform on each side thereof. The barrier system also has first and second supporting elements, each being mounted on a corresponding side of the elevator platform in alignment with the corresponding guiding element. The barrier system is provided with an inverted-U-shaped element having first and second legs and a transverse element extending therebetween. Each of the legs is slidably mounted inside a respective one of the guiding elements and cooperates with a corresponding one of the supporting elements that are adapted for supporting the legs and driving the inverted-U-shaped element with the elevator platform. The inverted-U-shaped element is slidable between a raised position providing a passage for the loads thereunder when the bridge platform and the elevator platform extend at a same level and a lower position wherein the transverse element extends across the passage for the loads for providing a guardrail between the platforms when the elevator platform extends below the bridge platform.

In a preferred embodiment of the invention, each of the supporting elements has a first plate attached to the elevator platform and a second plate attached to the first plate with a bolt and nut arrangement which advantageously acts as a shear safety pin.

In a further preferred embodiment of the invention, the barrier system is further provided with a kick plate mechanism mounted on the bridge platform and responsive to a movement of the elevator platform with respect to the bridge platform. The kick plate mechanism is provided with a kick plate having a raised position where the plate extends across the passage when both platforms extend at different heights and a lowered position where the kick plate extends below the bridge platform when both platforms extend at the same level.

BRIEF DESCRIPTION OF THE DRAWINGS

These and other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DETAILED DESCRIPTION OF THE PREFERRED EMBODIMENTS

In the following description, similar features in the drawings have been given similar reference numerals and in order to weight down the figures, some elements are not referred to in some figures if they were already identified in a precedent figure.

The present invention is directed to a barrier system for an aircraft loader that is particularly devised to improve safety of the operators working thereon. As it will be more detailed thereafter, the system of the present invention is particularly advantageous since the movement of the barrier system is responsive to the movement of the elevator platform with respect to the bridge platform, thereby providing a secure system that will not be time consuming for the operator. Thus, the barrier system proposed by the present invention advantageously allows the loader to still meet full loading cycle requirements imposed by airlines. In a further embodiment, the barrier system is further provided with a kick plate mechanism extending at the bottom of the bridge platform for preventing small objects extending on the bridge platform from falling on the elevator platform or in the vicinity thereof, thereby also improving the safety of the operators working on the ground proximate the aircraft loader.

Figures 1A, 1B, 1C:
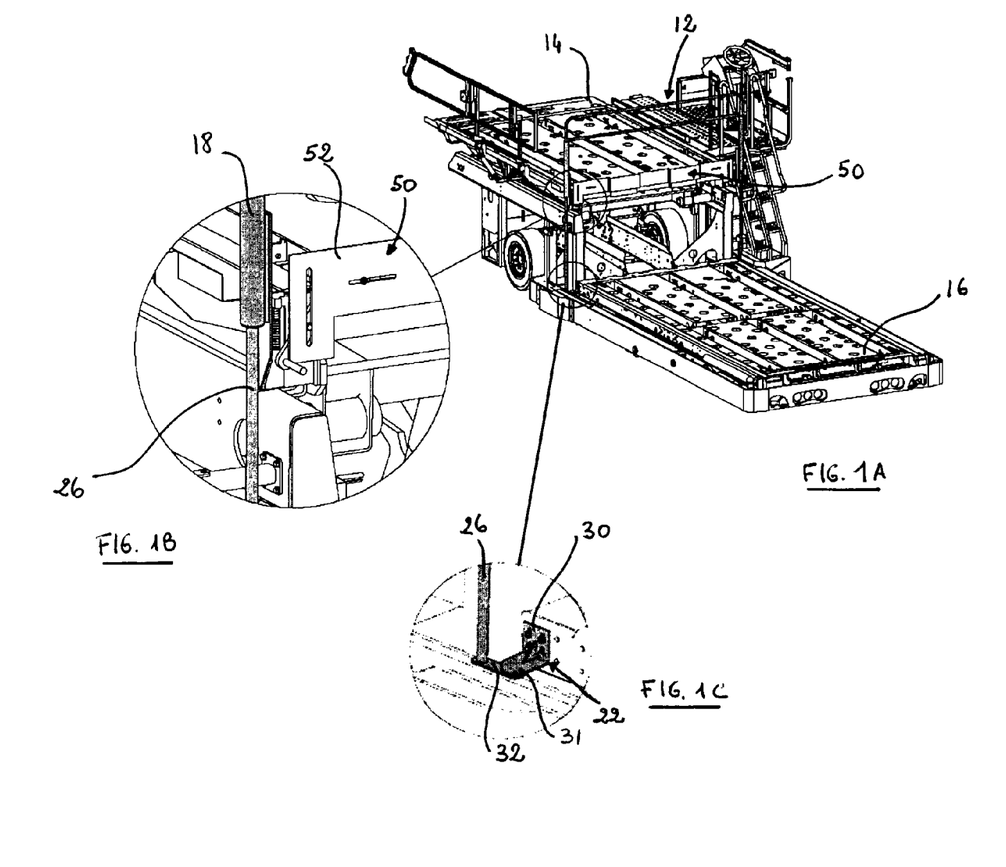
FIG. 1A is a perspective view of an aircraft loader provided with a barrier system, according to a preferred embodiment of the present invention.
FIG. 1B is an enlarged view partially showing the barrier system of FIG. 1A.
FIG. 1C is another enlarged view partially showing the barrier system of FIG. 1A.

Referring to FIGS. 1A to 1C, there is shown an aircraft loader 10 for loading goods (not shown) in and out of an aircraft (not shown), the loader 10 being provided with a barrier system 12 according to a preferred embodiment of the present invention. As illustrated, the barrier system 12 of the invention is particularly devised to be used with a loader 10 having two platforms and is mounted therebetween. In fact, the first platform is a bridge platform 14 intended to interface with the loading level of the aircraft while the second platform is an elevator platform 16 acting as a shuttle for bringing containers from ground height to aircraft door height or vice versa. As it is well known in the art, each of the two platforms 14, 16 is generally moveable between a respective uppermost position and a respective lowermost position. Of course, as it will be better understood upon reading of the present description, the barrier system 12 of the present invention could also be used on a loader 10 having more than two platforms.

Figures 2A, 2B, 2C:
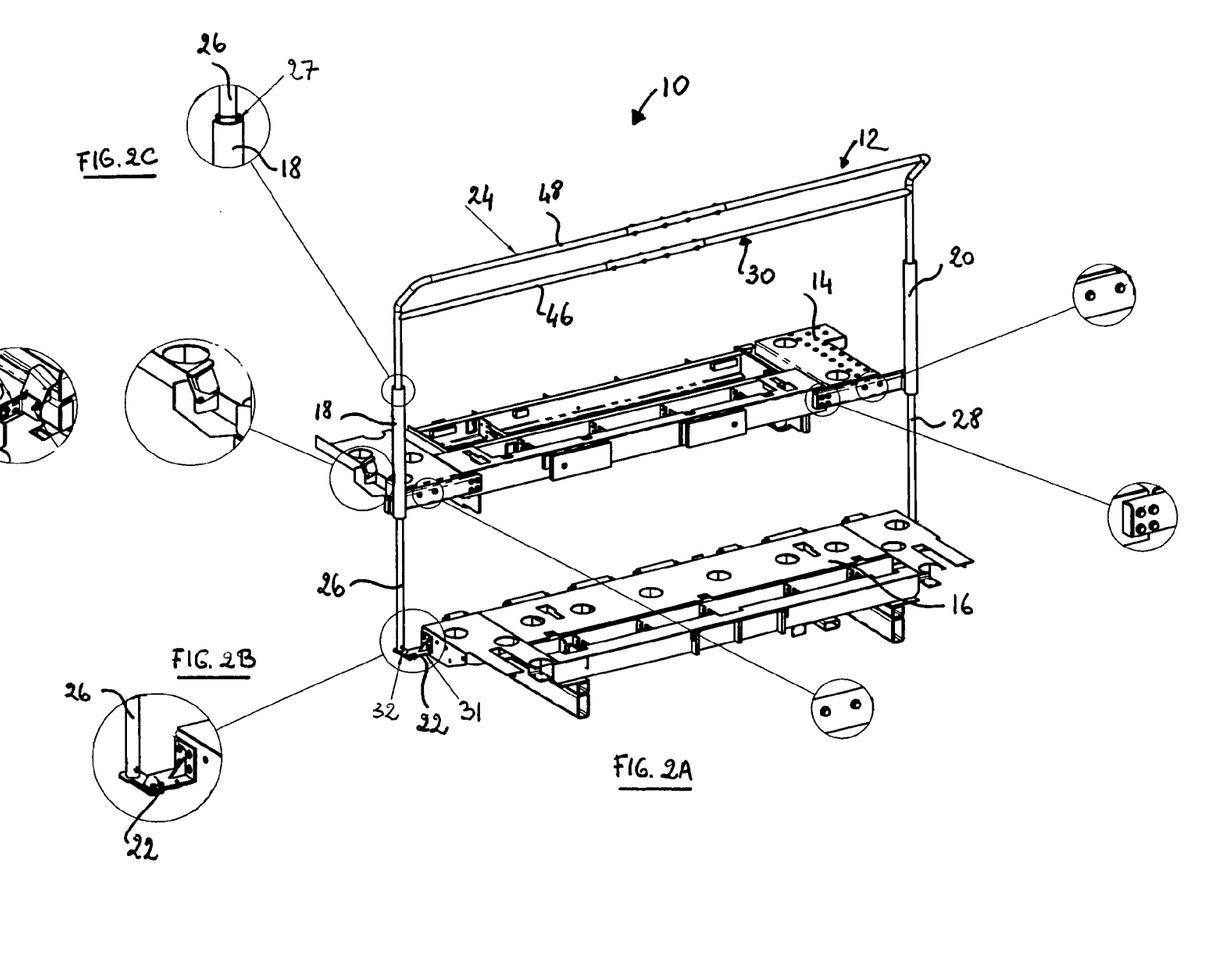
FIG. 2A is a perspective partial view of another aircraft loader provided with a barrier system, according to another preferred embodiment of the present invention.
FIG. 2B is an enlarged view partially showing the barrier system of FIG. 2A.
FIG. 2C is another enlarged view partially showing the barrier system of FIG. 2A.

Reference is now made to FIG. 2A which shows another barrier system 12 according to another preferred embodiment of the present invention. It should be mentioned that the loader 10 is only partially illustrated in order to better show the barrier system 12 of the invention. As illustrated, the barrier system 12 of the present invention is mounted on an aircraft loader 10 having a bridge platform 14 and an elevator platform 16 for transferring loads therebetween. The barrier system 12 has first and second upright guiding elements 18, 20, each being respectively attached to the bridge platform 14 on each side thereof. Preferably, each of the guiding elements 18, 20 comprises a tubular member. As better illustrated in FIG. 2B, the barrier system 12 also has first and second supporting elements 22 (only one is shown), each being mounted on a corresponding side of the elevator platform 16 in alignment with the corresponding guiding element 18, 20.

Still referring to FIG. 2A and also to FIG. 2B, the barrier system 12 is provided with an inverted-U-shaped element 24 having first and second legs 26, 28 and a transverse element 30 extending therebetween. Each of the legs 26, 28 is slidably mounted inside a respective one of the guiding elements 18, 20 and cooperates with a corresponding one of the supporting elements 22 that are adapted for supporting the legs 26, 28 and driving the inverted-U-shaped element 24 with the elevator platform 16. Preferably, and as it will be more detailed thereinafter, the legs 26, 28 are not attached to the supporting elements 22 that act as supports only. Thus, one can understand that the inverted-U-shaped element 24 is adapted to slide up and down, following the relative movement of the elevator platform 16 compared to the bridge platform 14.

Figure 3:
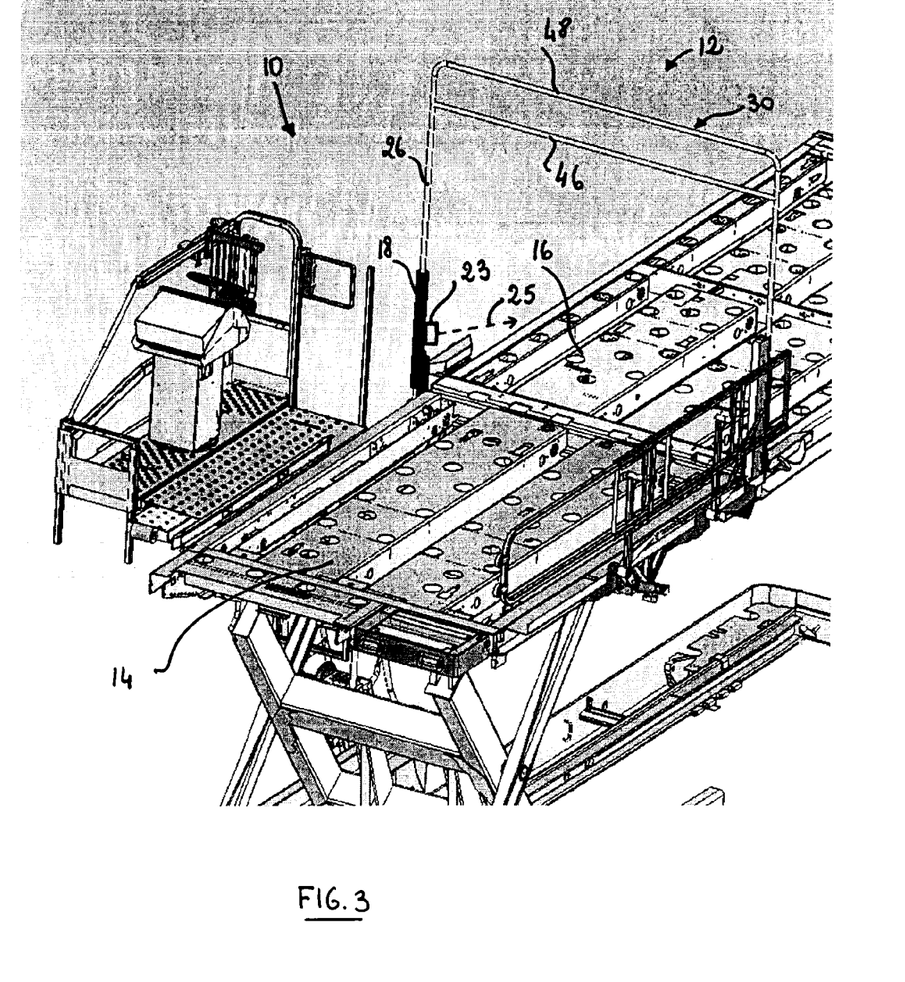
FIG. 3 is a perspective partial view of the aircraft loader shown in FIG. 1A, the bridge platform and the elevator platform extending at the same level.

The inverted-U-shaped element 24 is slidable between a raised position providing a passage for the loads thereunder when the bridge platform 14 and the elevator platform 16 extend at a same level and a lower position wherein the transverse element 30 extends across the passage for the loads for providing a guardrail between the platforms 14, 16 when the elevator platform 16 extends below the bridge platform 14. In FIGS. 1A and 2A, the inverted-U-shaped element 24 is in the lower position for defining a guardrail between the two platforms 14, 16 in order to prevent the operator to inadvertently fall from the bridge platform 14 on which he is working FIG. 3 illustrates the loader 10 of FIG. 1A in which both platforms 14, 16 extends at the same level. As it can be seen, the barrier system 12 is in the raised position for allowing the loads to freely move under the barrier system 12 between the bridge platform 14 and the elevator platform 16. In other words, when the elevator platform 16 approaches the bridge platform 14, the supporting elements 22 push the inverted-U-shaped element 24 up. This inverted-U-shaped element 24 then slides upwardly inside the guiding elements 18, 20, until the two platforms 14, 16 are at the same height. Then the containers are free to travel under the inverted-U-shaped element 24. In the opposite direction, as soon as the elevator platform 16 leaves the bridge platform 14, the inverted-U-shaped element 24 slides downwardly inside the guiding elements 18, 20, since it is only supported by the contact with the supporting elements 22.

Referring to FIG. 3, as illustrated, in a preferred embodiment of the present invention, the barrier system 12 is advantageously further provided with a sensor 23 for sensing the presence and/or absence of a container that would extend between the two platforms 14, 16 to prevent a movement of the platforms as long as the container is still on both platforms. Indeed, in certain cases, containers having a truncated base are used. In order to ensure that such containers are well detected, the sensor 23 is advantageously mounted proximate the junction of the two platforms 14, 16, for example on one of the guiding elements 18, 20 at a convenient height. In order to enhance the detection, the sensor 23 is advantageously mounted at an angle so as to project a beam 25 angularly with respect to the bridge platform 14. For a non-limitative example, the beam 25 could project upwardly at an angle of about 15 degrees. This preferred embodiment will advantageously ensure that no container extends in an overhang position between the two platforms 14, 16 before moving one of the platforms 14, 16. The sensor 23 can be an infra-red sensor but it should be understood that any other convenient means for monitoring the presence and absence of a container between the two platforms could be used.

As illustrated in FIGS. 1A, 2A and 3, the guiding elements 18, 20 and the supporting elements 22 advantageously project outwards the corresponding platform 14, 16 in order to not encroach on the space available for the loading and unloading of the loads.

Referring now to FIG. 1C, in a preferred embodiment, each of the supporting elements 22 is provided with a first plate 31 attached to the elevator platform 16 and a second plate 32 attached to the first plate 31 with attaching means, preferably a bolt and nut arrangement 34 and more preferably two such arrangements. Thus, in case of any pinching or extraordinary resistance, the bolts will break to prevent any further damage to the whole mechanism. In other words, these bolts can be considered as shear safety pins. Preferably, each of the first and second plates 31, 32 is made of steel but other material could be considered.

In the preferred embodiment illustrated in FIGS. 1A through 1C, the legs 26, 28 of the inverted-U-shaped element 24 are advantageously adapted for resting on the supporting elements 22 when the elevator platform 16 extends at a lowermost level. However, in another preferred embodiment, the legs 26, 28 do not rest on the supporting elements when the elevator platform 16 extends at the lowermost level. Instead, the guiding elements 18, 20 and the inverted-U-shaped element 24 are particularly shaped so that the transverse element 30 of the inverted-U-shaped element 24 abuts against the guiding elements 18, 20 when the elevator platform 16 extends at a lowermost level. This could be easily understood with reference to FIG. 2A. Indeed, let imagine that the bridge platform 14 shown in FIG. 2A has to be raised again for reaching the level of an aircraft door. The bridge platform 14 will then move upwards while the barrier system 12 remains immobile. During the raising of the bridge platform 14, the guiding elements 18, 20 that are fixed to the bridge platform 14 will abut against the transverse element 30 of the inverted-U-shaped element 24 and will then drive the inverted-U-shaped element 24 upwardly with the bridge platform 14. As this moment, the legs 26, 28 of the inverted-U-shaped element 24 do not rest anymore on the supporting element 22 until the bridge platform 14 is lowered or the elevator platform 16 is raised. This embodiment is particularly advantageous since the transverse element 30 acting as the guardrail will still be conveniently positioned to prevent falling on an operator from the bridge platform 14 whichever the height of the bridge platform 14. This is particularly advantageous for providing a loader adapted for a maximum of different aircrafts. In this embodiment, the guiding elements 18, 20 advantageously extend above the bridge platform 14 at a predetermined height and the transverse element 30 of the inverted-U-shaped element 24 is adapted for abutting against the guiding elements 18, 20 when the elevator platform 16 extends at a lowermost level.

Referring again to FIGS. 2A and 2C, in a further preferred embodiment of the present invention, means for stopping the downward movement of the inverted-U-shaped element 24 in the guiding elements 18, 20 are advantageously provided. For example, each leg 26, 28 may be provided with a bolt and nut arrangement 27 extending therethrough at a convenient height. Thus, the legs 26, 28 of the inverted-U-shaped element 24 will be allowed to slide downwardly inside the guiding elements 18, 20 until the bolt and nut arrangement 27 abuts against the guiding elements 18, 20 to prevent the inverted-U-shaped element 24 to further slide downwardly. This embodiment is particularly advantageous to ensure that the guardrail will always extend at a convenient safety height with respect to the bridge platform 14.

Referring again to FIGS. 1A and 3, the legs 26, 28 and the transverse element 30 of the inverted-U-shaped element 24 are advantageously made of a single piece or even a plurality of pieces, tubes for example, immovably attached together. In this case, the barrier system 12 is well adapted to a single specific width of loaders.

Figure 4A:
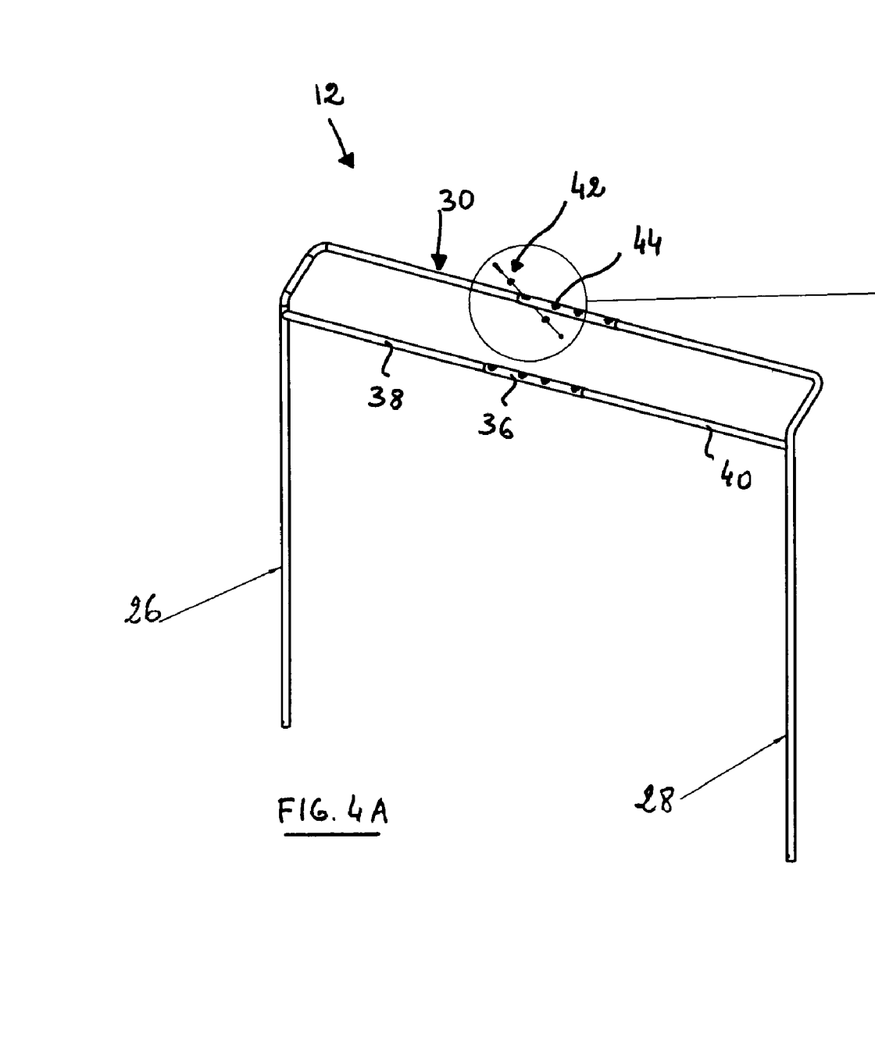
FIG. 4A is a perspective view of the inverted-U-shaped element of the barrier system shown in FIG. 2A.
Figure 4B:
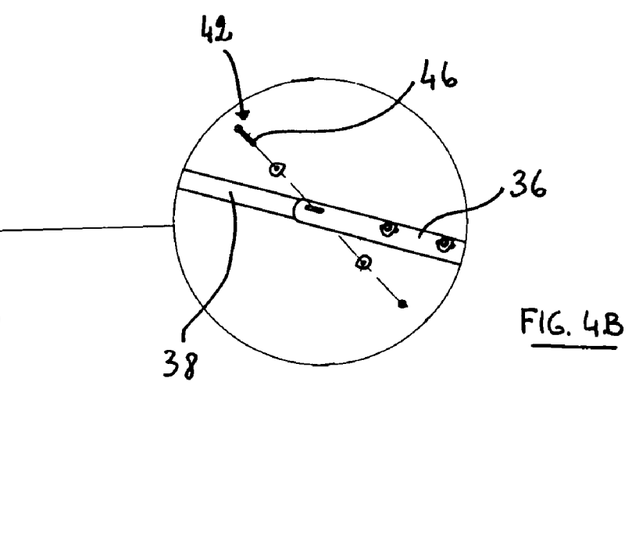
FIG. 4B is an enlarged view partially showing the inverted-U-shaped element of FIG. 4A.

However, referring now to FIGS. 4A and 4B, in order to provide a barrier system 12 whose width can be adapted to the width of any loader 10, a telescopic arrangement of the transverse element 30 is advantageously used. In the illustrated embodiment, the transverse element 30 is provided with a central tubular member 36 and first and second end members 38, 40 slidably mounted in the central member 36. The transverse element 30 is further provided with stop means 42 for mounting each of the elements 36, 38, 40 together in a predetermined position adapted to a width of the bridge platform 14. In the illustrated embodiment, the central member 36 is provided with a set of bores 44 distributed therealong for receiving a bolt and nut arrangement 46 in one of the bores 44, the chosen bore defining the width of the system barrier 12. Of course other arrangement allowing adapting the width of the barrier system 12 can be envisaged. For example, the transverse element 30 could be provided with two end members sliding one into the other and attachable in a plurality of positions for providing a plurality of different width for the barrier system.

In the embodiment of the barrier system 12 shown in FIGS. 1A and 3, the transverse element 30 has two parallel and spaced-apart members 46, 48 attached to the legs 26, 28 in the same plane than the one defined by the legs 26, 28. In the other embodiment shown in FIGS. 2A and 4A, the transverse element 30 also has two parallel and spaced-apart members 46, 48 attached to the legs 26, 28 but the upper one 48 projects outwards the bridge platform 14. This could be advantageous in certain case wherein the space available around the bridge platform 14 and the aircraft door is limited.

Figure 5:
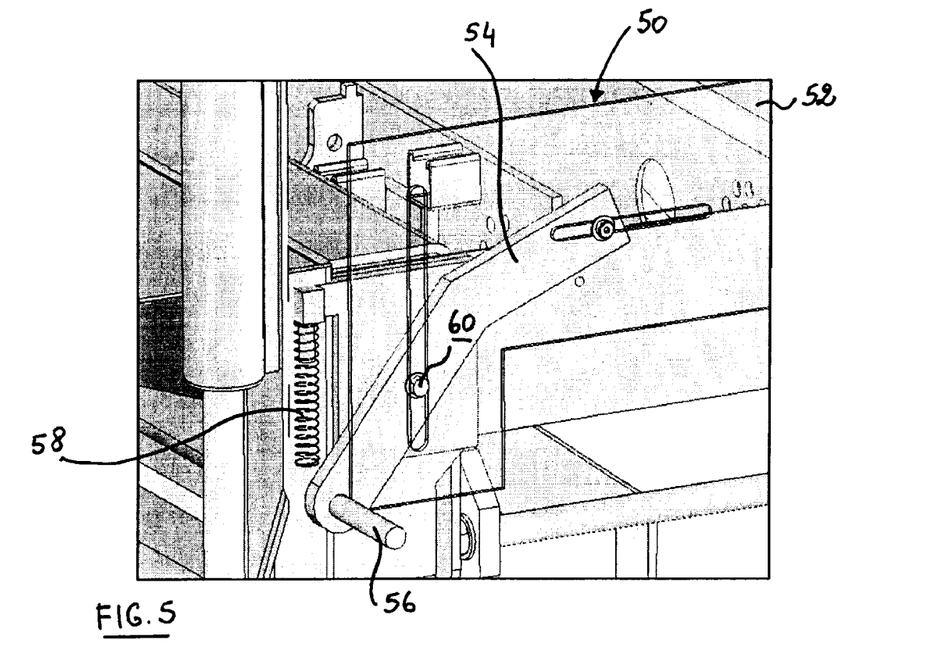
FIG. 5 is a perspective partial view of another aircraft loader provided with a barrier system according to a preferred embodiment of the present invention, the barrier system having a kick plate mechanism.
Figure 6:
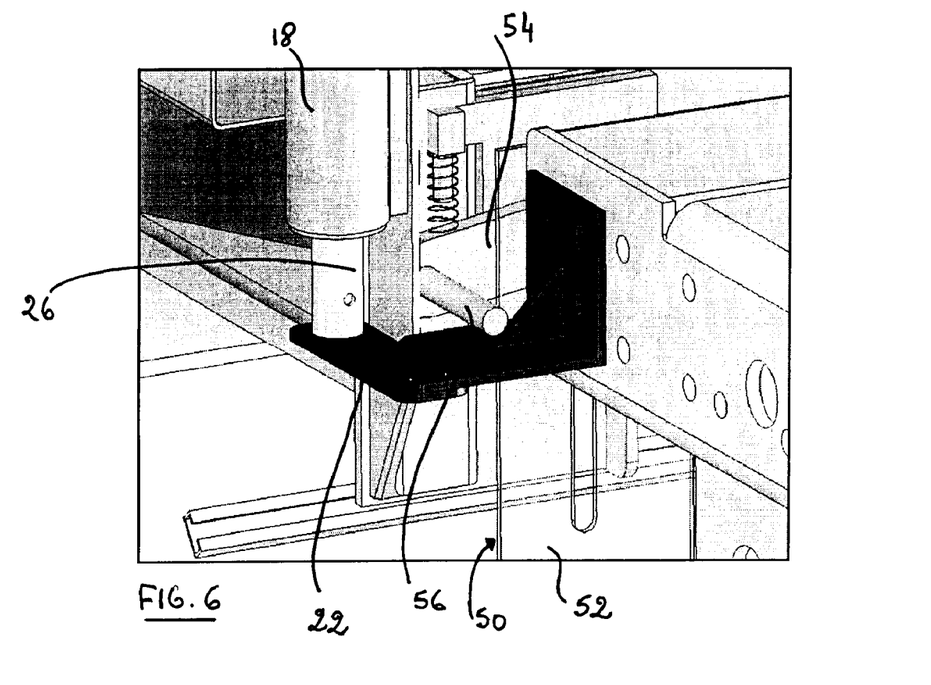
FIG. 6 is a perspective view of the aircraft loader shown in FIG. 5, the barrier system being in another position.

Referring again to FIGS. 1A, 1B, 5 and 6, a further advantageous embodiment of the present invention will now be described. In fact, in this embodiment, the barrier system 12 is advantageously further provided with a kick plate mechanism 50 devised to prevent some goods extending on the bridge platform 14 to accidentally fall down on the elevator platform 16 when the two platforms do not extend at the same height. The kick plate mechanism 50 is mounted on the bridge platform 14 and is responsive to a movement of the elevator platform 16 with respect to the bridge platform 14. The kick plate mechanism 50 is provided with a kick plate 52 having a raised position where the plate 52 extends across the passage when both platforms 14, 16 extend at different heights and a lowered position where the kick plate 52 extends below the bridge platform 14 when both platforms 14, 16 extend at the same level. In FIGS. 1A, 1B and 5, the kick plate 52 is in the raised position since the two platforms 14, 16 do not extend at the same level. In FIGS. 3 and 6, the kick plate 52 is in the lowered position since both platforms 14, 16 extend at the same level.

As better shown in FIGS. 5 and 6, in a preferred embodiment, the kick plate mechanism 50 is provided with a pivoting element 54 mounted with the kick plate 52 and the bridge platform 14 for driving the kick plate 52 between the raised and lowered positions. The pivoting element 54 is provided with an abutting member 56 cooperating with one of the supporting elements 22 for lowering the kick plate 52 when the elevator platform 16 is driven proximate the bridge platform 14. The kick plate mechanism 50 further has resilient means 58 mounted with the bridge platform 14 and cooperating with the abutting member 56 for urging the pivoting element 54, thereby driving the kick plate 52 in the raised position when the elevator platform 16 is lowered with respect to the bridge platform 14. As shown in the illustrated embodiment, the pivoting element 54 is fixed to a pivot point 60, giving to the pivoting element 54 the latitude to rotate around this point 60. Any movement applied on the left end of the pivoting element 54 will be inverted at the right end. Thus, the right end of the pivoting element 54 which is slidably attached to the kick plate 52 acts as a lever for the kick plate 52 which will translate vertically in response to a movement of the left end of the pivoting element 54. As it can be seen, when the two platforms 14, 16 are not at the same height, the resilient means 58, a spring for example, urge the left end of the pivoting element 54 in a downward position. The right end of the pivoting element 54 thus holds the kick plate 52 upwards in the raised position. When the elevator platform 16 is raised, the supporting element 22 pushes the abutting member 56 of the pivoting element 54 upwards, thus compressing the resilient means 58. The right end of the pivoting element 54 is then lowered so the kick plate 52 is now lowered under the top of the two platforms 14, 16 to allow containers to be transferred from one platform to the other one.

This preferred embodiment is particularly advantageous since it provide an enhanced safety for operators working both on the bridge platform and on ground proximate the aircraft loader. Moreover, this preferred embodiment is particularly easy to implement without negatively influence the loading cycle requirements imposed by airlines.

Although preferred embodiments of the present invention have been described in detail herein and illustrated in the accompanying drawings, it is to be understood that the invention is not limited to these precise embodiments and that various changes and modifications may be effected therein without departing from the scope of the present invention.

What is claimed is:
1. An aircraft loader, comprising:
   a bridge platform and an elevator platform for transferring loads therebetween, each of the two platforms being movable between respective uppermost and lowermost positions; and
   a barrier system, including:
      first and second upright guiding elements, each being respectively attached to the bridge platform on each side thereof;
      first and second supporting elements, each being mounted on a corresponding side of the elevator platform in alignment with the corresponding guiding element; and
      an inverted-U-shaped element having first and second legs and a transverse element extending therebetween, each of said legs being slidably mounted inside a respective one of the guiding elements and cooperating with a corresponding one of the supporting elements that are adapted for supporting the legs and driving the inverted-U-shaped element with the elevator platform, said inverted-U-shaped element being slidable between a raised position providing a passage for the loads thereunder when the bridge platform and the elevator platform extend at a same level and a lower position wherein the transverse element extends across the passage for the loads for providing a guardrail between said platforms when said elevator platform extends below the bridge platform.

2. The aircraft loader according to claim 1, wherein each of said guiding elements comprises a tubular member.

3. The aircraft loader according to claim 1, wherein the guiding elements and the supporting elements project outwards from the bridge and elevator platforms, respectively.

4. The aircraft loader according to claim 1, wherein each of said supporting elements comprises a first plate attached to the elevator platform and a second plate attached to the first plate with attaching means.

5. The aircraft loader according to claim 4, wherein said attaching means comprise a bolt and nut arrangement.

6. The aircraft loader according to claim 1, wherein said transverse element comprises a central tubular member and first and second end members slidably mounted in the central member, said transverse element further comprising stop means for mounting said elements together in a predetermined position adapted to a width of the bridge platform.

7. The aircraft loader according to claim 1, wherein the legs of the inverted-U-shaped element are adapted for resting on the supporting elements when the elevator platform extends at a lowermost level.

8. The aircraft loader according to claim 1, wherein the guiding elements extend above the bridge platform and the transverse element of the inverted-U-shaped element is adapted for abutting against the guiding elements when the elevator platform extends at a lowermost level.

9. The aircraft loader according to claim 1, wherein said transverse element projects outwards from the bridge platform.

10. The aircraft loader according to claim 1, further comprising a kick plate mechanism mounted on the bridge platform and responsive to a movement of the elevator platform with respect to the bridge platform, said kick plate mechanism being provided with a kick plate having a raised position where the plate extends across the passage when both platforms extend at different heights and a lowered position where the kick plate extends below the bridge platform when both platforms extend at the same level.

11. The aircraft loader according to claim 10, wherein said kick plate mechanism further comprises a pivoting element mounted with the kick plate and the bridge platform for driving said kick plate between said raised and lowered positions.

12. The aircraft loader according to claim 11, wherein said pivoting element is provided with an abutting member cooperating with one of the supporting elements for lowering the kick plate when the elevator platform is driven proximate the bridge platform.

13. The aircraft loader according to claim 12, wherein the kick plate mechanism further comprises resilient means mounted with the bridge platform and cooperating with the abutting element for urging said pivoting element, thereby driving the kick plate in the raised position when both platforms extend at different levels.

14. The aircraft loader according to claim 1, further comprising a sensor mounted proximate the inverted-U-shaped element for monitoring a presence of a container between both platforms.

* * * * *